United States Patent [19]

Martin, geb. Böser

[11] 4,417,792

[45] Nov. 29, 1983

[54] DEVICE FOR MOUNTING DIAPOSITIVES IN A STRIP AND AN APPARATUS FOR PROJECTING THE STRIP-MOUNTED DIAPOSITIVES

[76] Inventor: Liesel Martin, geb. Böser, Markschiedsweg 27, 6336 Solms/OT Oberbiel, Fed. Rep. of Germany

[21] Appl. No.: 270,333

[22] Filed: Jun. 4, 1981

[30] Foreign Application Priority Data

Jun. 4, 1980 [DE] Fed. Rep. of Germany ....... 3021138

[51] Int. Cl.³ ............................................. G03B 23/08
[52] U.S. Cl. ..................................... 353/120; 353/108
[58] Field of Search ................. 353/120, DIG. 2, 108, 353/109; 40/361, 364, 158 B, 537; 206/456, 0.83, 0.84, 486, 820, 330

[56] References Cited

U.S. PATENT DOCUMENTS

| T.921,013 | 4/1974 | Tucker | 353/120 |
|---|---|---|---|
| 2,268,529 | 12/1941 | Stiles | 40/158 B |
| 2,334,176 | 11/1943 | Sherbinin | 40/158 B |
| 2,362,434 | 11/1944 | Fitch et al. | 40/158 B |
| 3,219,406 | 11/1965 | Arvis | 353/109 |
| 3,242,605 | 3/1966 | Kleinschmidt | 353/120 X |
| 3,297,398 | 1/1967 | Donofrio | 353/120 |
| 3,369,451 | 2/1968 | Brandt et al. | 353/120 X |

FOREIGN PATENT DOCUMENTS

| 2262860 | 7/1974 | Fed. Rep. of Germany | 353/120 |
|---|---|---|---|
| 2838551 | 3/1980 | Fed. Rep. of Germany | 353/120 |
| 43-474101 | 2/1968 | Japan | 353/120 |
| 419065 | 10/1934 | United Kingdom | 353/109 |

*Primary Examiner*—Harry N. Haroian
*Attorney, Agent, or Firm*—Edmund M. Jaskiewicz

[57] ABSTRACT

Diapositives are mounted in a strip formed by a pair of flexible sheet members each having at least two picture openings therein in side-by-side relationship and the sheet members are fastened to each other in face-to-face relationship mutually offset by a single picture opening. The frame is interposed between the sheet members and a diapositive is moveably positioned within an opening in the frame. The thickness of the frame is greater than that of the diapositive so that a diapositive is freely moveable within a frame opening and has play between the sheet members. An apparatus for projecting the strip mounted diapositives is provided with a pair of cassettes one of which contains a strip in which the diapositives are mounted and the second cassette contains a strip without any diapositives. The ends of the strips are automatically connected to each other for successively introducing the diapositives into the apparatus.

17 Claims, 26 Drawing Figures

DEVICE FOR MOUNTING DIAPOSITIVES IN A STRIP AND AN APPARATUS FOR PROJECTING THE STRIP-MOUNTED DIAPOSITIVES

The present invention relates to the mounting of diapositives for introduction to a slide projector and the like, more particularly, to the mounting of diapositives in a strip and an apparatus particularly adapted for projecting such strip mounted diapositives.

It is known to prepare diapositive or slide film for projecting or viewing by mounting each of the individual images of the film in a separate frame so as to form a slide. These slides are assembled into a cassette or tray and then individually introduced into the slide projector apparatus from which the image is projected onto a viewing screen. The slide is then returned to its position in the tray or cassette and the next succeeding slide is introduced into the projector. In many forms of such apparatus the introduction and return of the slide to the cassette and the movement of the cassette through the apparatus is done automatically but under the control of the operator. A relatively high mechanical cost is required to perform these functions. In addition, the introduction and return of each slide to the cassette requires a relatively long time. A further disadvantage is that the cassettes or trays occupy considerable space and a relatively few slides or diapositives can be contained in a cassette in relation to the volume or space occupied by the cassette.

In view of these disadvantages and problems, various proposals have been made to arrange the diapositives or slides successively one behind the other, such as in the form of a film, and to subsequently coil this film-like structure for storage purposes. To prevent scratching of the surfaces of the diapositives during winding or coiling various forms of spacers have been provided in these diapositive film strips, one example of which is illustrated in DE-OS No. 2 456 175. However, these spacers added considerably to the space occupied by a wound-up film of diapositives.

In DE-OS No. 2 708 430 it was proposed to mount the diapositives in individual frames and to hinge the individual frames into a continuous strip which can be then folded up in a zigzag or accordeon manner. However, such a strip structure also required a considerable amount of space for storage.

The various proposals of the prior art for mounting successively the diapositives or slides had the further disadvantage that the diapositives were immovably positioned or mounted in the strip so that during projection of a diapositive, the diapositive appearing in the film picture window was susceptible to bending because of the heat generated by the illuminating device. Such a bending of the diapositive could not be avoided and this bending thus necessitated a continuous refocusing of the essential picture content of the diapositive. If the diapositives were mounted in frames covered by glass plates there then appeared Newton's rings in the projected image which were annoying to the viewers.

It is therefore the principal object of the present invention to provide an improved device for mounting diapositives in a strip and an apparatus particularly adapted for projecting such strip-mounted diapositives.

It is another object of the present invention to provide a device for the mounting of a number of diapositive slides such that these slides can be introduced successively to a projection apparatus and the mounted slides can be compactly contained within a cassette occupying a minimum of space.

It is a further object of the present invention to provide a mounting strip for diapositives which prevents any damage or scratching of the surfaces of the diapositive during coiling of the strip and within which the diapositives are so mounted that there is no bending of the diapositives when they are subjected to heat during the projection process.

It is an additional object of the present invention to provide a device for mounting of a single diapositive or for mounting a plurality of diapositives in a strip which mounting device is economical to manufacture, simple in construction and occupies a minimum of space even while containing a large number of diapositives.

According to one aspect of the present invention a device for mounting diapositives in a strip to introduce successively the diapositives for projection in a slide projector and the like may comprise a pair of flexible sheet members each having at least two picture openings therein in side-by-side relationship and the sheet members are fastened to each other in face-to-face relationship but mutually offset by a single picture opening. A frame having a picture opening therein is interposed between the sheet members such that the picture openings in the frame and sheet members are aligned. The opening in the frame is slightly larger than the diapositive which is to be positioned therein and also larger than the picture openings in the sheet members. The frame also has a thickness greater than that of the diapositive such that a diapositive is freely moveable within a frame and has play between the sheet members but at the same time is securely retained between the sheet members.

By mounting the diapositives between two sheet members or covers and a mask is provided for each diapositive, the diapositive is floatingly mounted within the strip so that the diapositive does not bend out of the picture opening when the strip is coiled or wound. At the same time, however, the sheet members will hold the diapositive fixed in the strip.

Any heat energy transmitted from the frame to the diapositive and vice versa is uniformly distributed from all sides over the entire diapositive so that the diapositive is uniformly heated and thus prevents a partial bending of the diapositive.

Since the front and rear covers or sheet members are offset respectively by a picture opening, individual diapositives can be successively arranged in sequence by means of assembling additional sheet members. There is thus no limit upon the length of a strip with diapositives mounted therein and approximately 1,000 diapositives can be thus accommodated in a single strip. By making the sheet members self-adhering, a diapositive can be readily removed by separating the sheet members and replaced by another diapositive or additional diapositives can be inserted into the strip. A half sheet member or cover is preferably provided at the beginning and end of a strip and thus grips a single diapositive at the front and rear faces in order to obtain a uniform termination at the ends of a strips.

Also according to the present invention there is provided a slide projector having a pair of cassettes one of which contains a strip having diapositives mounted therein and the second cassette contains an empty strip without any diapositives. A hook structure is provided on the engaging ends of the strips in the cassettes so that these strips may be interconnected together automatically to facilitate displacement of the strip with diapositives through the slide projector. The slide projector can also be provided with a viewing window so that the operator may obtain a preview of the diapositive immediately preceeding the diapositive being projected.

Other objects and advantages of the present invention will be apparent upon reference to the accompanying description when taken in conjunction with the following drawings, which are examplary, wherein.

Proceeding next to the drawings wherein like reference symbols indicate the same parts throughout the various views, a specific embodiment and modifications of the present invention will be described in detail.

As may be seen in FIGS. 1–4, the diapositive strip according to the present invention is indicated generally at 1 and comprises sheet members 2 and 3 made of a flat flexible material each of which has picture openings 4 and 5, respectively, therein. In this particular embodiment, the sheet number 2 is provided with two picture openings 4 which are in side-by-side relationship and the sheet member 3 has also two picture openings in side-by-side relationship with all of the picture openings being of the same size and shape. The picture openings are thus aligned or positioned one behind the other as seen in the longitudinal direction of the strip and illustrated in FIGS. 1 and 3.

Figures 1, 2:
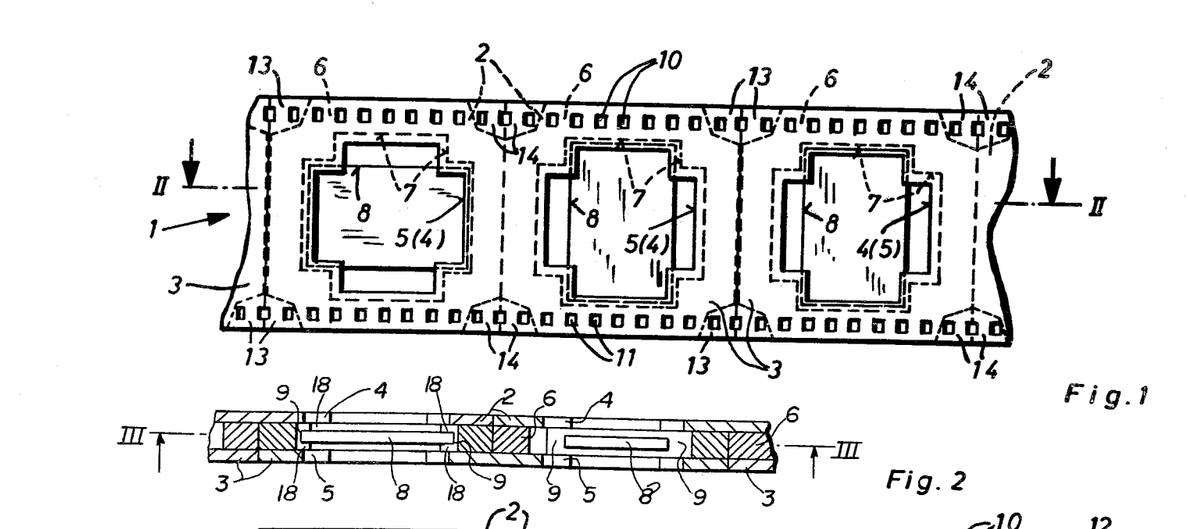
FIG. 1 is a plan view of an assembled diapositive strip according to the present invention.
FIG. 2 is a sectional view taken along the line II—II of FIG. 1 with the thicknesses of the sheet members and frames being exaggerated to illustrate the overlapping relationship of the sheet members.

The sheet members 2 and 3 are attached to each other in face-to-face relationship by a suitable adhesive or the inner faces of the sheet members may be provided with a self-adhesive layer. The sheet members 2 and 3 are offset for overlap a distance of one picture opening width as can be seen in FIG. 2. Before the sheet members are fastened to each other there is positioned between the sheet members a frame or mask 6 shown in FIG. 4 which also has a picture opening 7. This frame 6 can also be self-adhesive on both faces thereof so as to fasten the sheet members and the frame to each other.

Figure 4:
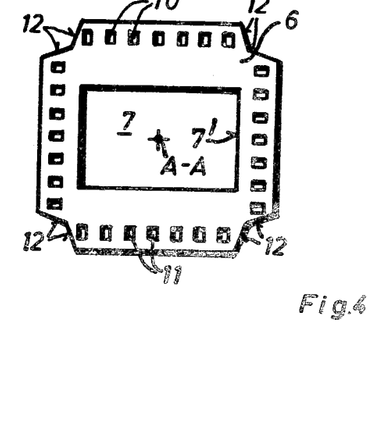
FIG. 4 is a plan view of a frame or mask employed in the assembled strip of FIGS. 1–3.

The picture opening 7 of the frame 6 is slightly larger than the picture openings 4 and 5 in the sheet members 2 and 3. The picture opening 7 in the frame is also slightly larger than a diapositive 8 which is positioned within the opening 7 before the frame 6 is assembled between the sheet members 2 and 3. The diapositive 8, however, is larger than the picture openings 4 and 5 in the sheet members 2 and 3. The diapositive 8 is thus provided with a slight play or clearance 9 with respect to the edges 7' of the frame window opening 7 but the diapositive 8 cannot fall out of the picture openings 4 and 5 of the sheet members 2 and 3.

The thickness of the frame 6 is greater than that of a diapositive 8 as may be seen in FIG. 2 so that a play or clearance 18 is provided between the edges of the picture openings of the sheet members in order to accommodate different thicknesses of film which are known to occur with color diapositives. At the same time, the diapositive 8 is freely moveable or "floating" within the frame opening 7 and between the sheet members 2 and 3.

Since the sheet members 2 and 3 are mutually offset by one picture opening width during assembly, a new frame with a new diapositive can be positioned on the projecting sheet member and can then be covered with a second sheet member to form another projecting portion upon which a further frame and diapositive can be mounted.

The diapositives 8 are preferably cut, if necessary, to provide an edge or border around the picture or image portion of the diapositive or the sizes of the openings 4, 5 and 6 is so selected that the entire picture content of the diapositive is reproduced on projection.

The sheet members 2 and 3 and the frames 6 are provided with respective series of perforations 10 and 11 along their edges for receiving the teeth of drive pinions for displacing the diapositive strip within the slide projector.

Figure 5:
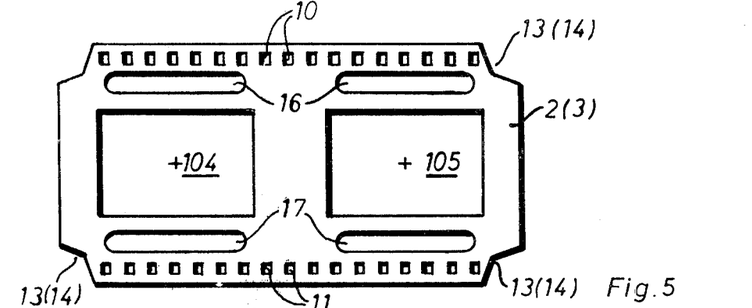
FIGS. 5–8 are plan views similar to that of FIG. 1 of modified sheet members according to the present invention.
Figure 6:
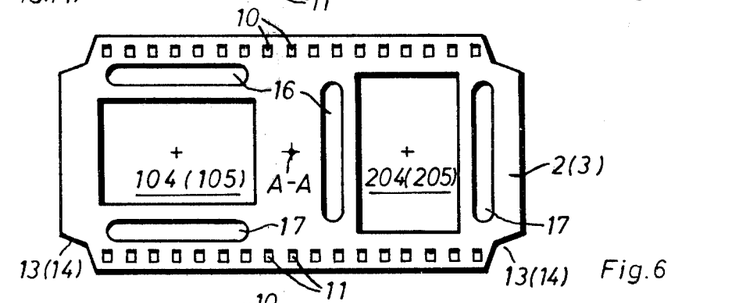
Figure 7:
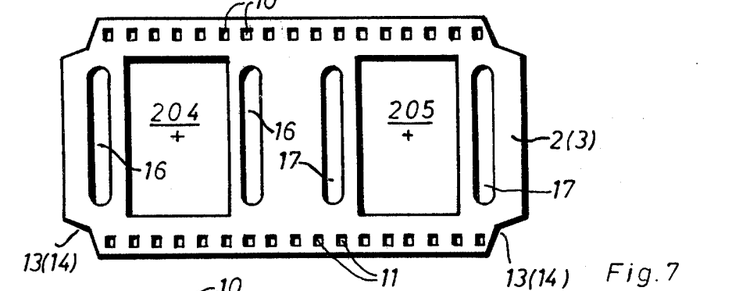

The diapositives or slides generally have a rectangular shape corresponding approximately to the shapes of the picture openings in the sheet members 2 and 3. The pictures on the slides may be disposed either horizontally for projection with the longer axis in the horizontal direction or vertically for projection with the longer axis in the vertical direction. If pictures of a horizontal format are to be mounted in the strip, the sheet members 2 and 3 can be provided with horizontal picture openings 104 and 105 as shown in FIG. 5. If the pictures on the slides have a vertical or upright format, the sheet members can then be provided with vertical openings such as 204 and 205 shown in FIG. 7. If the slides comprise both horizontal and vertical pictures, then sheet members can be used as shown in FIG. 6 having both horizontal 104 and vertical 205 openings. By rotating the sheet members 2 and 3 through an angle of 180° about an axis A—A which is perpendicular to the plane of projection, the horizontal and vertical picture formats can be interchanged.

According to the present invention the sheet members may be provided with square openings for diapositives having a square picture content. Such square formats can also be combined in the sheet members with rectangular horizontal or vertical openings as described above.

Figure 3:
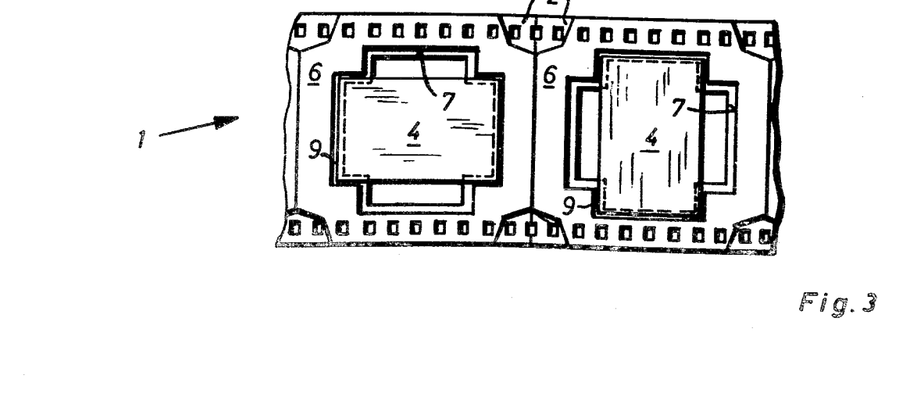
FIG. 3 is a sectional view taken along the line III—III of FIG. 2.

The sheet members 2 and 3 shown in FIG. 1-3 are provided with picture openings 4 and 5 which are a combination of the horizontal and vertical openings described above in that each opening is cross-shaped so that a diapositive can be positioned selectively in this opening in either a vertical or horizontal position. Thus, should a diapositive 8 be assembled in the horizontal position portions of the picture openings 4 and 5 will be opening through which light can pass during projection. However, these openings are covered by the mask or frame 6 which is constructed with only a single opening which may be either horizontal or vertical. The frame 6 can be symmetrically constructed so that the diapositive can be provided with the desired position in the strip by rotating the frame 6 through an angle of 90° about axis A—A as illustrated in FIG. 4 and which axis is perpendicular to the plane of projection.

Figure 10:
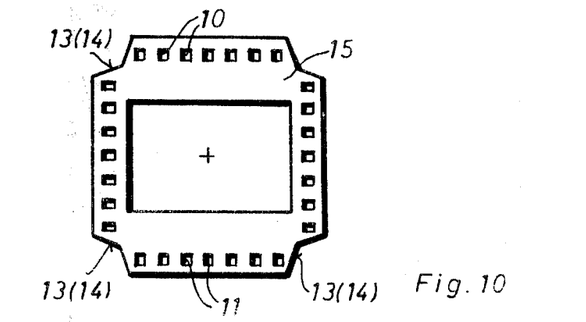
FIG. 10 is a plan view of a sheet member having a length of one picture opening and used at the ends of a mounting strip according to the present invention.

When a number of sheet members with inserted frames and diapositives are interconnected serially to form a long strip, there will remain exposed or uncovered portions of the inner surfaces of the sheet members 2 and 3 at each end of the strip because of the overlapping relationship of the sheet members 2 and 3. In order to provide a smooth and uniform termination at each end of the long strip, a single picture sheet member 15 as shown in FIG. 10 is provided in addition to the double picture sheet members and is adhered to the inner surface of the projecting end of a double picture sheet member 2 or 3.

As may be also shown in FIGS. 5-8, the sheet members 2 and 3 are provided with additional openings 16 and 17 positioned as shown for receiving a transparent inlay, such as a portion of the frame 6 which is constructed to be transparent in the positions corresponding to the openings 16 and 17. These openings 16 and 17 and the transparent inlays may be used for captioning or tilting each individual picture and this title or caption will be projected together with its respective picture.

The corners 12 of a frame 6 are cut away as also shown in FIGS. 1-8 so as to facilitate insertion of the frame 6 between the sheet members 2 and 3 with its picture opening 7 in either a horizontal or vertical position. The corners 13 and 14 of the sheet members 2 and 3 are correspondingly cut away in order to facilitate joining together of the sheet members and a more precise correspondence or alignment with the frame or mask 6 when the sheet members are offset by a picture opening width. Similarly, the corners 13 and 14 of the single opening sheet members 15 shown in FIG. 10 are cut away.

The picture openings of the sheet members 2, 3 and 15 as described above are provided with straight edges and the openings are preferably formed by being stamped out of the respective sheet members and frames. However, in FIG. 8 there is a modification of the shape of the picture opening wherein the opening 4 of sheet member 2 is formed with a crenelated edge 20 consisting of alternating series of projections 21 and indentations 22. The sheet member 3 similarly has a crenelated edge of its picture opening but the indentations and projections of a picture opening on sheet member 2 are staggered with respect to the correspondent components of a picture opening on sheet member 3 so that an indentation on one picture opening covers a projection on the edge of another opening so that a straight edge of a picture opening is formed when the two sheet members 2 and 3 are fastened together in the manner as described above.

Figure 8:
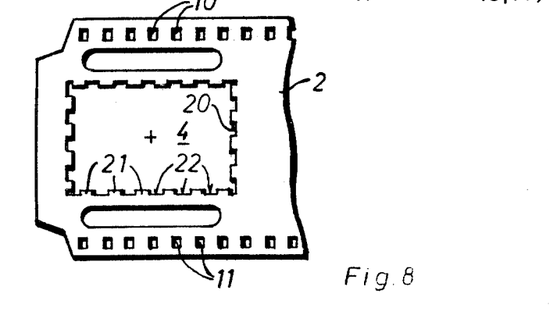

The series of indentations and projections along the edges of the picture openings has the advantage that an inserted diapositive can be readily pushed out of the strip by means of a punch of the approximate size and shape of the picture openings 4 and 5 since the projections 21 of the sheet members are bendable. After a new diapositive has been inserted between the bent projections 21 these projections can then be pushed back into position flush with the sheet members 2 and 3. This construction facilitates changing or replacing of a single diapositive in a completely assembled strip of diapositives.

The sheet members 2 and 3 as well as the frames 6 are preferably made of a material which is flexible and is able to resist temperatures up to about 200° C. These components may thus be made out of suitable plastic or synthetic resin materials so that a complete strip of diapositives can be readily rolled into the shape of a coil and positioned in a cassette. The surfaces of the diapositives will not be damaged or marred in any way during this rolling and storing process since the surfaces of the diapositives are set back from the front and rear faces of the strip as formed by the outer faces of the sheet members 2 and 3. In addition, a diapositive will not bend out of a picture opening when a strip is rolled up since the diapositives are mounted in the strip with play and are freely moveable.

Figure 9:
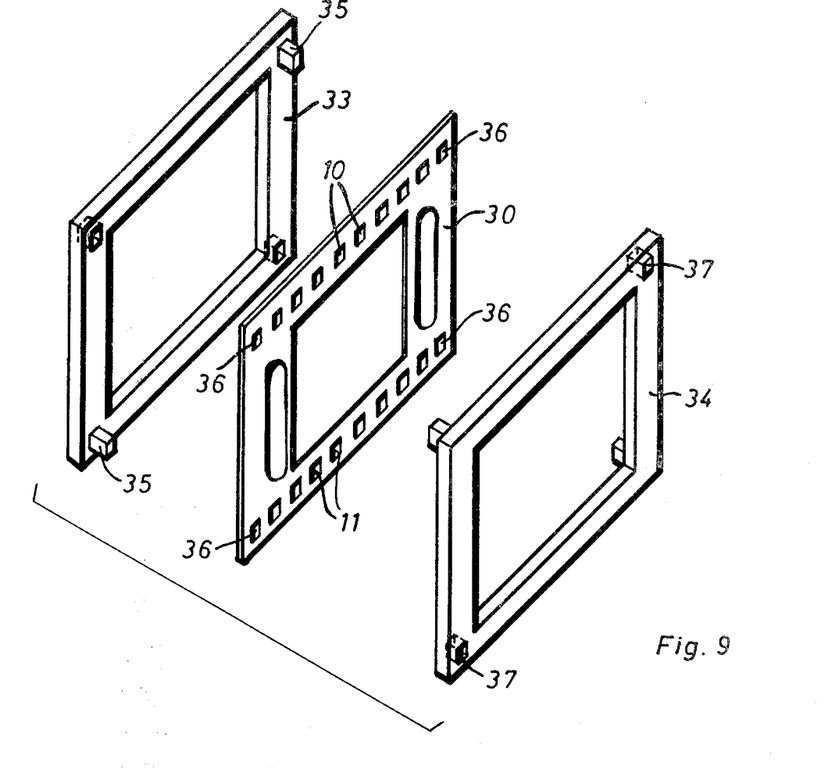
FIG. 9 is an exploded perspective view of a device according to the present invention for mounting a single diapositive.

According to the present invention, when it is desired to preview or to project a diapositive from a slide projector in which can only be loaded conventional single frame cassettes, a diapositive is cut to shape from the film as shown at 30 in FIG. 9, positioned between two sheet members such as 15 shown in FIG. 10 and then mounted between two rigid frame parts 33 and 34. The frame parts each have projections 35 which pass through the perforations 36 in the diapositive strip and snap into corresponding sockets or receivers 37 in the other frame part. By providing the crenelated edges around the picture opening of a frame 6 which might be used in such a single slide assembly, the slide can be easily pushed out and inserted at a corresponding position in the diapositive strip.

Figure 13:
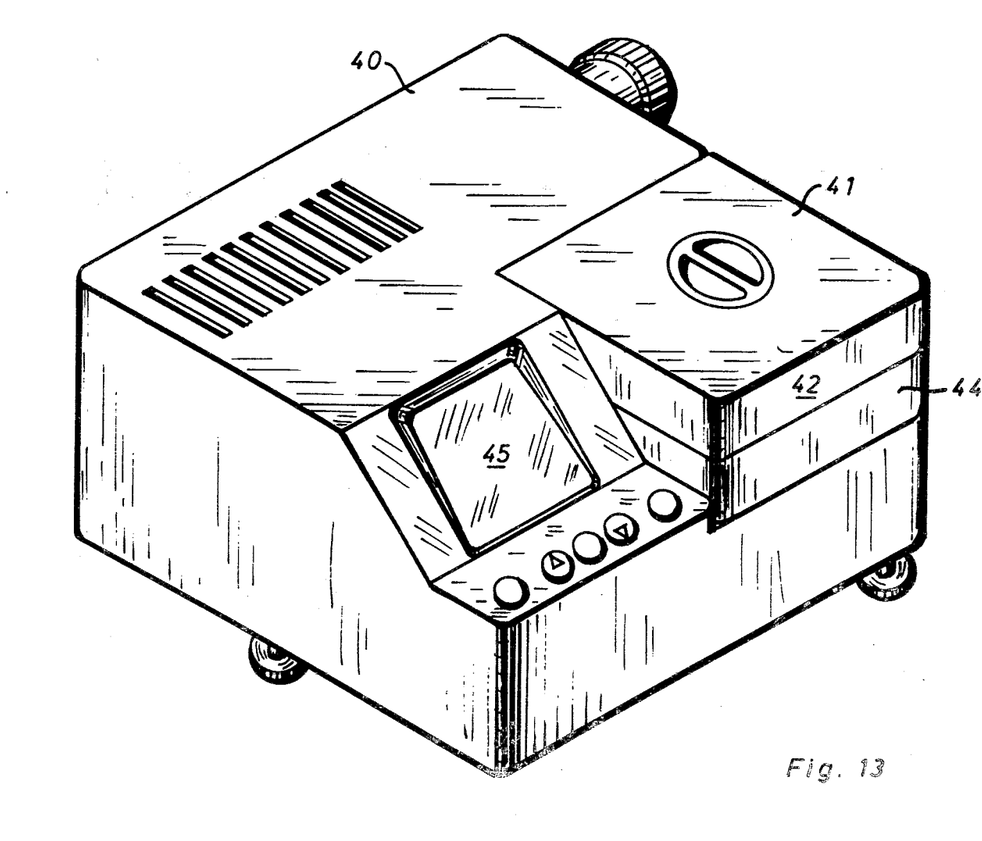
FIG. 13 is an overall perspective view of a slide projector according to the present invention.

In FIG. 13 there is shown a projector 40 which has a double cassette 41 or cassette assembly consisting of an upper cassette or cassette component 42 which carries a strip 43 in which are mounted a series of diapositives and a lower cassette or cassette component 44 which contains a strip without any diapositives. In order to project the diapositives, an initial end portion 43′ of the strip 43 within the cassette 42 is automatically fastened to an end portion 46′ projecting from the cassette 44 of the strip 46 which is without diapositives and the strip is then passed through the projector. Pinion drive gears 51 and 52 shown in FIG. 11 extend through openings in the walls of the cassettes to engage the perforations along the edges of the strip and are driven by a mechanical Maltese cross drive, which is not shown but known in the art, to introduce successively the diapositives into the projection window of the projector apparatus.

As may be also seen in FIG. 13, the projector 40 has a viewing window 45 which may be made of ground glass through which a diapositive which is not yet introduced into the projection window can be previewed so that the user of the apparatus can, for example, accurately match his lecture or dialogue to the sequential pictures. Thus, the diapositive preceding the diapositive being projected may be examined in the viewing window 45.

The strip ends 43' and 46' are automatically connected together on pushing the cassette 41 or the cassette element 42 into position on the projector 40. The cassette elements 42 and 44 can thus be firmly connected together to, in effect, form a double cassette. However, according to the present invention, single or individual cassettes 42 and 44 can also be provided such that the cassette element 44 is always assembled in position on the projector and may even be an integral component thereof and only the cassette element 42 is removeable and interchangeable.

The strip ends 43' and 46' must be positioned in very precise relationship to each other in the cassettes in order that these strip elements are automatically self-connected. For this purpose, a T-shaped guide element 50 is provided as may be seen in FIGS. 11 and 12 to align and precisely position at least the cassette element 42. The guide 50 is positioned perpendicularly to the direction of movement of the film strip which is indicated by the double-ended arrow 19. The cassette element 42 is thus pushed into the projector or withdrawn from the projector in the directions of the double-ended arrow 23.

Figures 11, 12:
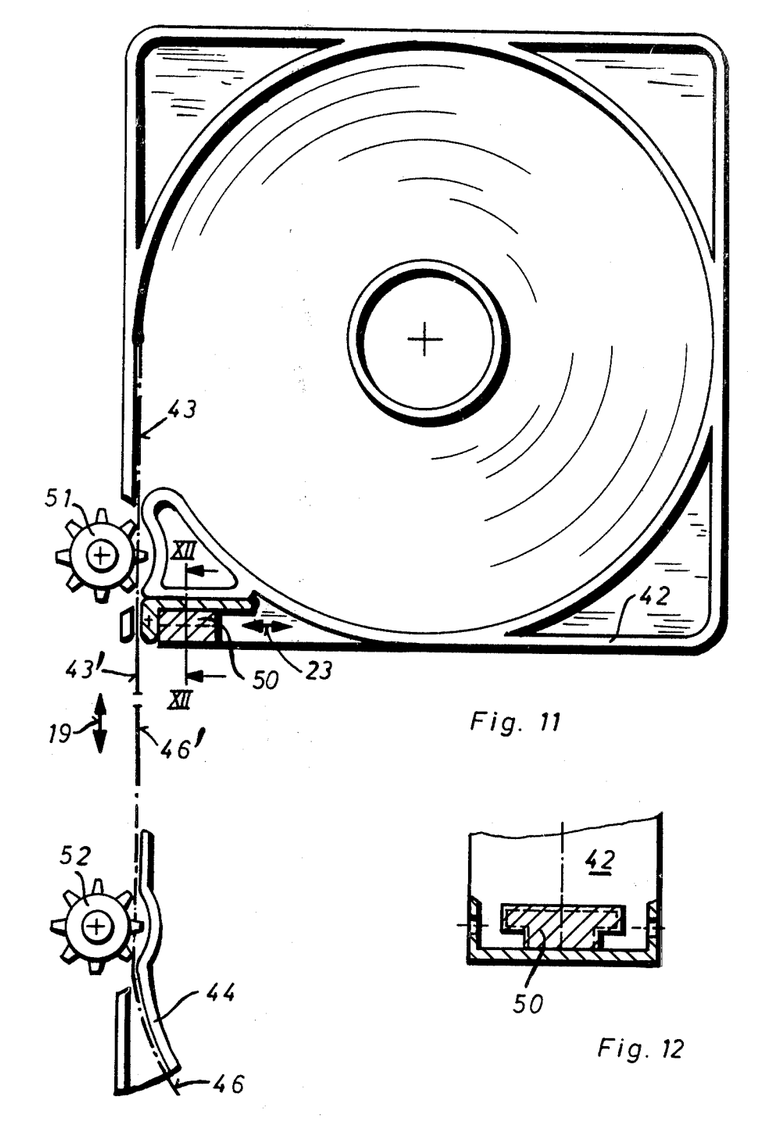
FIG. 11 is a plan view of a cassette for containing a strip according to the present invention and a portion of the slide projector which is shown in section.
FIG. 12 is a sectional view taken along the line XII—XII of FIG. 11.

The diapositive strip 43 is moved into the projecting apparatus by means of the pinion gears 51 and 52 which are respectively associated with the cassette elements 42 and 44 and extend through openings in the walls of these respective cassette elements to engage the perforations in the strips.

Figure 15A:
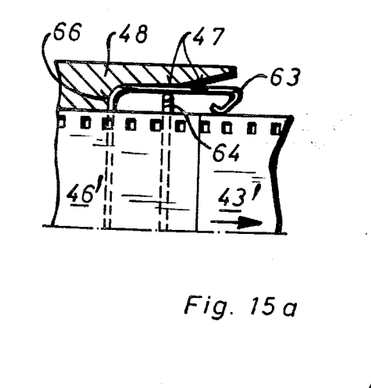
FIGS. 15a–c are plan views of the ends of strips showing the structure for interconnecting these ends.
Figure 15B:
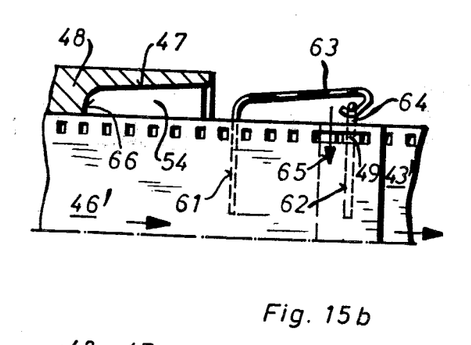
Figure 15C:
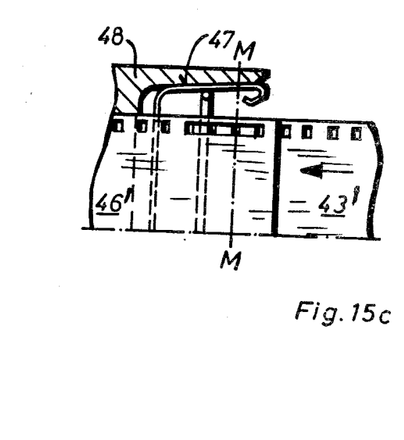
Figure 16:
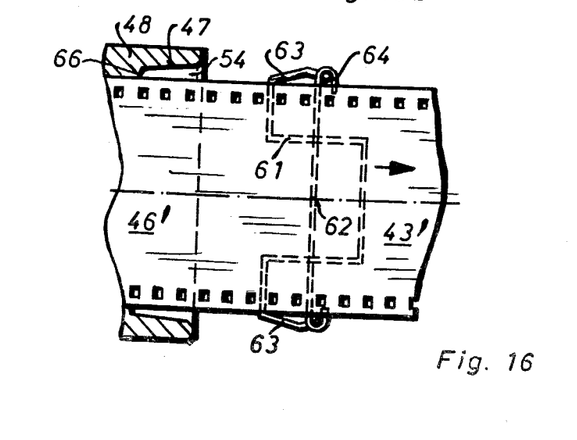
FIG. 16 is a view similar to that of FIG. 15b but in greater scale to show details of the connecting structure.
Figure 17A:
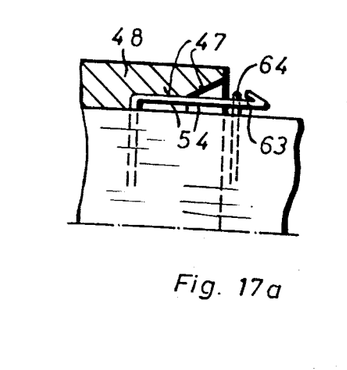
FIGS. 17a–c are views similar to FIGS. 15a–c but showing a modification thereof.
Figure 17B:
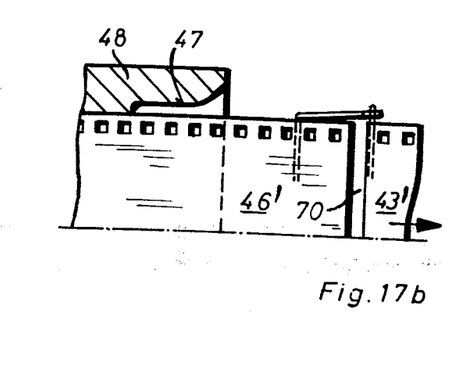
Figure 17C:
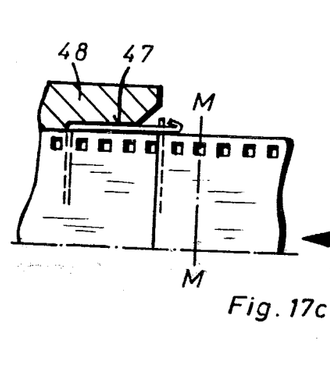
Figure 18:
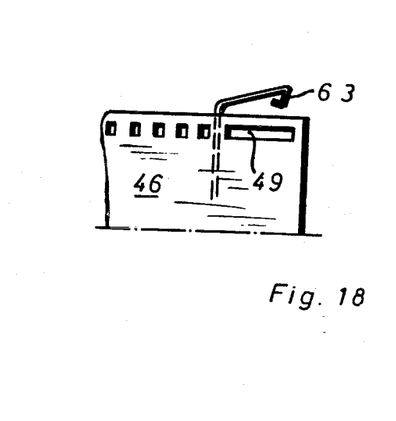
FIG. 18 is a plan view of an end of a strip showing a mounting hook and elongated perforation.

In order to connect the strip ends 43' and 46', these ends are guided together into an end-to-end abutting relationship or an end-to-end relationship with a gap 70 in between as indicated in FIGS. 17a-c or into a superposed or overlapping relationships as shown in FIGS. 15a-c. A spring wire 61 which may have a single bend or convolution therein as shown in FIG. 16 is inserted into or otherwise attached to the end 46' of a strip. The wire 61 extends outwardly beyond the edges of the strip and on these ends of the wire there are provided hooks 63 which extend in the longitudinal direction of the strip. In a similar manner, a spring wire 62 is inserted into or attached to the strip end 43 and is provided on its ends with receiving hooks 64. Both hooks 63 and 64 extend laterally outwardly of the edges of the film strips as may be seen in the drawings.

Each cassette 42 and 44 has an opening 48 therein through which a film strip passes to enter or leave the respective cassette. The opening 48 is provided with tapering or oblique faces 47 such that the hooks 63 on the strip end 46' are pressed toward the edges of the strip as shown in FIG. 15a. The strip end 46' will be in this position when the cassette is removed from the slide projector. When the cassette is inserted into the projecting apparatus the strip end 46' remains in this position such that the hooks 64 of the strip end 43' can easily engage or be hooked under the hooks 63 of the strip end 46' when the cassette is inserted. Upon actuation of the pinions 51 and 52, the strip end 46' will be displaced to the right as viewed in FIGS. 15b and 17b. The pinion 51 initially rotates idly in a slotted opening 49 aligned with the perforations in the strip end 46' until a firm connection is produced between the strip ends 43' and 46' by the self-connecting or inter-engagement of the hooks 63 and 64. When this connection of the strip ends occurs, the movement of the strip through the projecting apparatus now occurs.

When the strip is rewound, the strip end 46' moves into the position as shown in FIGS. 15c or 17c which corresponds to the initial position of the strip end. The hooks 63 are again pressed inwardly toward the longitudinal edges of the strip in the direction of the arrow 65 and remain in this position until the hook engages a stop 66 at the end of the oblique surface 47 in the opening 48. Since the pinion 51 now runs idly in the slotted opening 49 during this position of the strip end, the strip end 46' of the strip carrying the diapositives remains stationary in this position. The cassette 42 can now be withdrawn from the projecting apparatus and replaced by a new cassette.

The hooked structures as described above and the oblique surface construction of the opening are provided on both edges of each strip end.

In order to prevent the strip ends from moving perpendicularly from the plane of projection, particularly on connecting or disconnecting of the strip ends, additional inclined or oblique surfaces 54 are provided in the openings 48 and these surfaces are perpendicular to the plane of the projection and extend over the width of the strip so as to define the slotted opening 48.

The convolution or bend shown in the wire 61 in FIG. 16 prevents rotation of the wire 61 so that the hooks 63 and 64 do not deflect during the connecting or disconnecting operation. If there should be any rotation or deflection of these hooks, the hooks 63 and 64 might then move past each other without connection. While not shown in the drawing, the wire 62 is also preferably provided with such a convolution or bend. This bend does not prevent or impede winding or coiling of the strip since the wires are preferably of a relatively thin resilient material.

The connecting or disconnecting of the strip ends can occur when the strip ends 43' and 46' overlap or are superimposed upon each other in their initial position as shown in FIG. 15. However, according to the present invention, the hooks 63 and 64 can be made of such a length that the strip ends only need to approach each other in end-to-end relationship and leave a space therebetween 70 as shown in FIG. 17b. When this construction is employed, precautions must be taken that during displacing of the strip the perforation holes are in the correct spacing relationship.

The axial position of the pinion 51 associated with cassette 42 is of significance for correct connecting and disconnecting operations. The axial position of the pinion is indicated by the axes M—M in FIGS. 15c and 17c. The displacement of the connected strip is carried out by means of both pinions 51 and 52. Connecting and disconnecting occurs by engagement of the pinion 52 in the perforation and movement of the strip end 46' against the strip end 43' and a hook inserted in this end. During this process, pinion 51 will also rotate but idly since its teeth will be positioned in the slotted opening 49 as described above.

Figure 14:
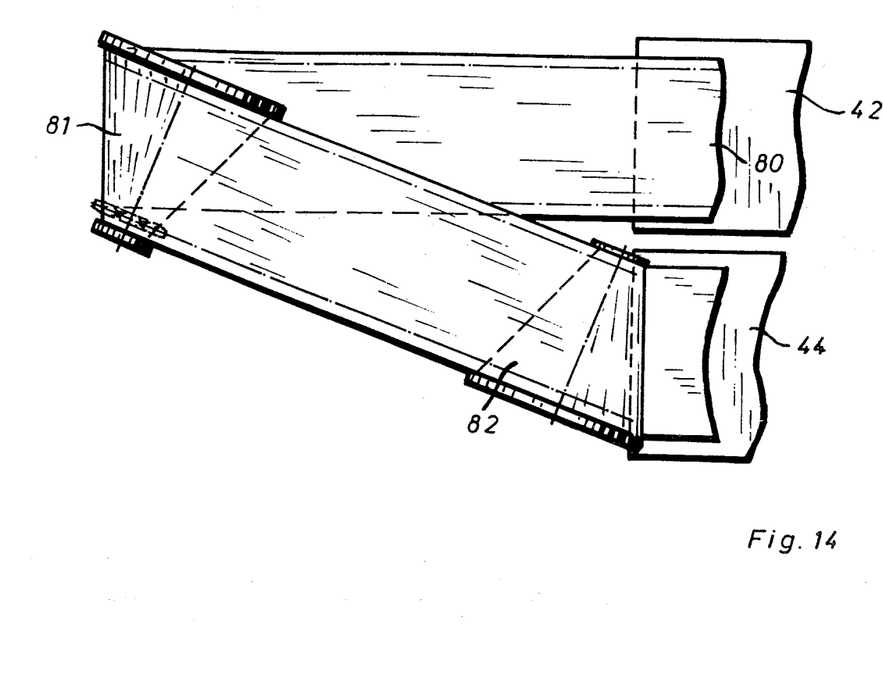
FIG. 14 is an elevational view of a portion of the apparatus of FIG. 13 showing a structure for guiding a strip from one cassette to another cassette.

The cassettes or cassette elements 42 and 44 do not necessarily have to be positioned one on top of the other as shown in the drawing but can be positioned separated from each other as shown in FIG. 11. When the cassette elements 42 and 44 are superimposed on one another in a vertical relationship, a structure for deflecting the film or guiding the film from the vertically disposed cassettes must be provided. In FIG. 14, the strip 80 emerging from the cassette 42 is guided around a conical rotatable roller 81 mounted in the projecting apparatus which guides or deflects the strip downwardly in an oblique direction so that the strip can enter directly into the cassette 44 which must then be arranged in a correspondingly oblique position. However, if both cassettes 42 and 44 are parallel to each other as shown in FIG. 14 an additional conical roller 82 is provided to again deflect or guide the strip 80 so that the strip now runs into a straight line into the cassette 44.

Figure 19:
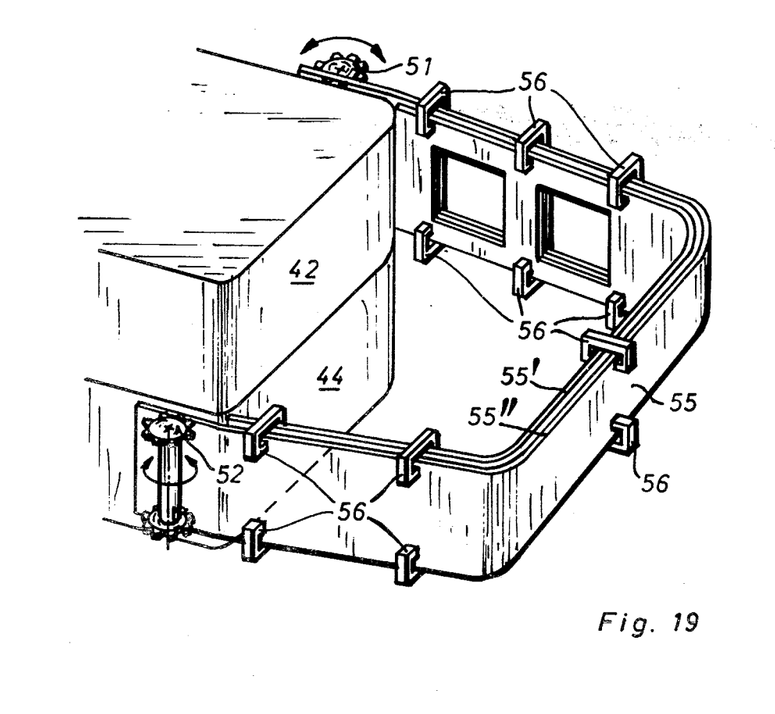
FIG. 19 is a perspective view of another guide structure for guiding a strip from one cassette to another cassette when the cassettes are vertically arranged.
Figure 20:
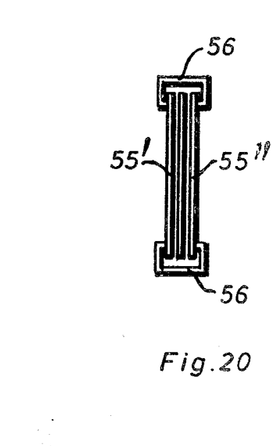
FIG. 20 is an end view of the guide structure of FIG. 19.

A modified guide structure is shown in FIG. 19 wherein the strip is guided within a guide structure 55 comprising two flat strips or members 55' and 55" which are spaced an equal distance apart from each other by a plurality of spacing elements 56. The strip guide structure 55 thus performs the functions of the guide rollers 81 and 82 shown in FIG. 14. The hooks 64 of the strip end 46' are advantageously drawn downwardly sufficiently far to engage over the strip members 55' and 55". As a result of this structure, any lateral drifting of the diapositive strip is prevented when the strip members 55' and 55" are firmly attached to the cassette in line with the slots 48 with their oblique and tapering surfaces 54.

The connecting hooks of FIGS. 15-17 need not necessarily be positioned in the projection plane but at least one of the hook pairs can be arranged perpendicularly to the plane of projection as has been shown in FIG. 17a.

Figure 21:
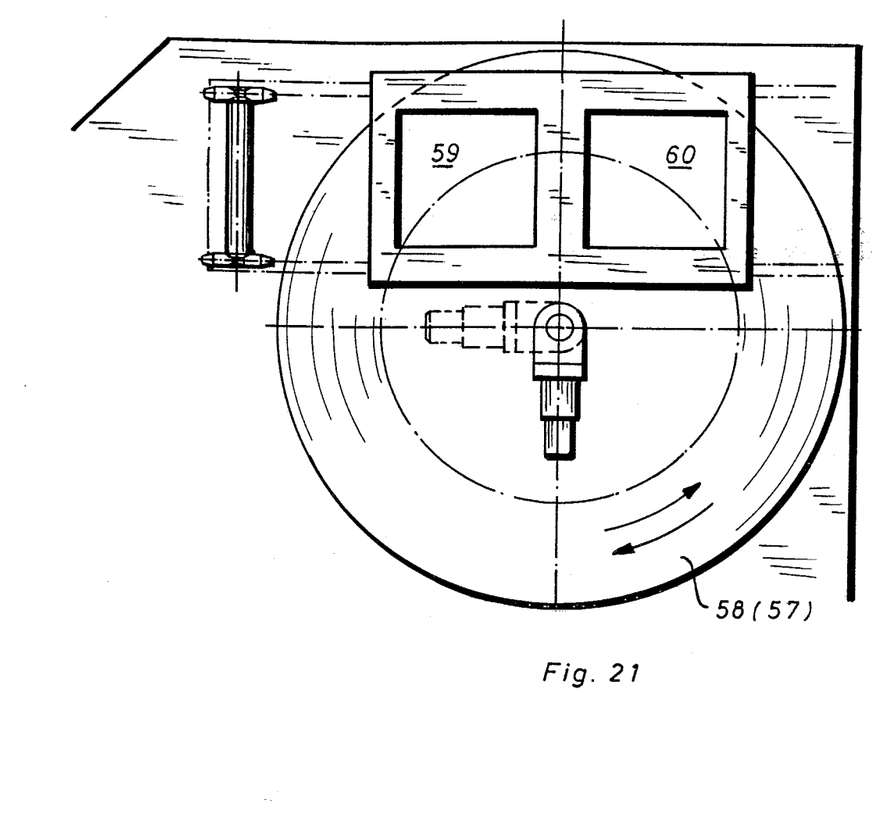
FIG. 21 is a plan view of the double diaphragm structure employed in the projection apparatus according to the present invention.
Figure 22:
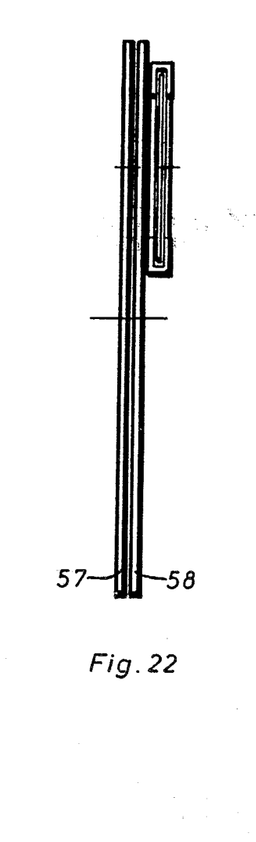
FIG. 22 is a side elevational view of the double diaphragm structure of FIG. 21.

The projecting apparatus 40 is preferably provided with a double diaphragm shown in FIGS. 21 and 22 for blocking the passage of light along the projection path during a change of the diapositives. This double diaphragm consists of two disks 57 and 58 which rotate in opposite directions as indicated by the arrows thereon. Each disk is provided with two openings 59 and 60. In the projection position, the openings of the two disks are superposed so that a diapositive can be projected through the aligned opening 60 onto a screen and at the same time a diapositive can be previewed through the aligned openings 56 by observing the diapositive through the viewing window 45.

In many cases, the pinions 51 and 52 are not sufficiently powered to wind up the strip in the cassettes 42 and 44. It is therefore preferable that separate drive means be provided for this winding process. It is also preferred that a small resisting torque or force be imposed upon the wind-up and delivery rolls so that the strip 80 is always being wound up under a tension. For this purpose, small electric motors can be provided with one motor operatively connected to each cassette. These motors can operate under different voltages.

Thus it can be seen that the present invention has disclosed an effective device for the mounting of diapositives in a strip for successive projection from a projecting apparatus and also a projecting apparatus particularly adapted for such a strip. The invention also provides for the automatic connecting and interconnecting of strips which is carried out during the insertion or withdrawal of cassettes or cassette components from the projecting apparatus.

It will be understood that this invention is susceptible to modification in order to adopt it to different usages and conditions, and accordingly, it is desired to comprehend such modifications within this invention as may fall within the scope of the appended claims.

What is claimed is:

1. A film strip device for mounting a plurality of slide film sections in side-by-side relationship in a row to introduce successively the diapositives for projection in a slide projector and the like, comprising at least one first flexible sheet member having at least two picture openings therein in side-by-side relationship in a row, at least one second flexible sheet member similarly having at least two picture openings therein in side-by-side relationship in a row, said first and second sheet members being fastened to each other in face-to-face relationship with their respective picture openings being aligned and one of said sheet members overlapping the other sheet member by one picture opening such that a portion of one of said sheet members corresponding in length to one picture opening is not covered whereby a plurality of said first and second sheet members can be fastened to each other in alternating overlapping relationship to form a film strip of such a length to accommodate a predetermined number of slide films sections, a frame having a second picture opening therein interposed between said sheet members and having its second picture opening corresponding with aligned picture openings in said two sheet members, said frame picture opening being slightly larger than a diapositive to be positioned therein and larger than the sheet member picture openings, said frame having a thickness greater than that of the diapositive such that a diapositive is freely moveable within a said frame and has play between said sheet members, said sheet member picture openings being smaller in size than the individual slide film sections mounted in the film strip.

2. A device as claimed in claim 1 wherein at least one of said sheet members and said frame is self-adhering.

3. A device as claimed in claim 1 wherein each diapositive has a slight border around a picture portion thereof.

4. A device as claimed in claim 1 wherein edges of the picture openings of said sheet members are straight lines.

5. A device as claimed in claim 1 wherein edges of the picture openings of said sheet members are crenelated to define projections which are bendable.

6. A device as claimed in claim 5 wherein indentations defined by the crenelated edges of a said picture opening in a said first sheet member are aligned with the projections of an aligned picture opening of said second sheet member.

7. A device as claimed in claim 6 wherein the projections on edges of the picture openings of said first and second sheet members define a straight edge around the aligned picture opening.

8. A device as claimed in claim 1 wherein said sheet members are made of a material which is resistant to temperatures of about 200° C.

9. A device as claimed in claim 1 wherein said picture openings in said sheet members are substantially rectangular and are disposed in one of longitudinal and transverse relationship to the strip.

10. A device as claimed in claim 1 wherein said picture openings in said sheet members are cross-shaped so as to accommodate diapositives in one of longitudinal and transverse positions in said strip.

11. A device as claimed in claim 1 wherein said frame has a square outer shape and its picture opening corresponds to the shape of the diapositive.

12. A device as claimed in claim 1 wherein there are additional aligned openings in said sheet members and said frame to which captions for the diapositives can be exhibited.

13. A device as claimed in claim 1 and further comprising a third sheet member having a single picture opening to be attached to one of said first and second sheet members which is offset from the other at the end of a strip.

14. A device as claimed in claim 1 wherein said sheet members and said frame have perforations along their edges extending in the direction of movement of the strip.

15. A device as claimed in claim 1 wherein the corners of the frame and said sheet members are cut away.

16. A device as claimed in claim 1 wherein each sheet member is provided with two picture openings.

17. A device as claimed in claim 1 wherein said offset sheet members are glued or heat sealed to each other.

* * * * *